(12) United States Patent
Nassor et al.

(10) Patent No.: US 8,572,120 B2
(45) Date of Patent: Oct. 29, 2013

(54) METHOD AND DEVICE FOR CONTROLLING ACCESS TO A SHARED DOCUMENT IN STATION-TO-STATION COMMUNICATION NETWORK

(75) Inventors: Eric Nassor, Thorigne Fouillard (FR); Frédéric Maze, Langan (FR)

(73) Assignee: Canon Kabushiki Kaisha, Tokyo (JP)

( * ) Notice: Subject to any disclaimer, the term of this patent is extended or adjusted under 35 U.S.C. 154(b) by 1118 days.

(21) Appl. No.: 11/018,392

(22) Filed: Dec. 22, 2004

(65) Prior Publication Data

US 2005/0138188 A1 Jun. 23, 2005

(30) Foreign Application Priority Data

Dec. 22, 2003 (FR) ...................................... 03 15167

(51) Int. Cl.
G06F 7/00 (2006.01)
(52) U.S. Cl.
USPC .......................................... 707/782; 707/783
(58) Field of Classification Search
None
See application file for complete search history.

(56) References Cited

U.S. PATENT DOCUMENTS

| 2002/0103818 A1* | 8/2002 | Amberden | 707/205 |
| 2002/0119821 A1* | 8/2002 | Sen et al. | 463/42 |
| 2002/0165727 A1* | 11/2002 | Greene et al. | 705/1 |
| 2002/0188735 A1* | 12/2002 | Needham et al. | 709/229 |
| 2003/0063771 A1* | 4/2003 | Morris et al. | 382/100 |
| 2005/0027995 A1* | 2/2005 | Menschik et al. | 713/193 |

OTHER PUBLICATIONS

Fenkam et al., "Towards an Access Control System for Mobile Peer-to-Peer Collaborative Environments", Conference Proceedings Article, pp. 95-100, Jun. 10, 2002.
Judge et al., "CITADEL: A Content Protection Architecture for Decentralized Peer-to-Peer File Sharing Systems", Conference Proceedings Article, pp. 1496-1500, Dec. 1, 2003.

* cited by examiner

Primary Examiner — Robert Beausoliel, Jr.
Assistant Examiner — Nirav K Khakhar
(74) Attorney, Agent, or Firm — Fitzpatrick, Cella, Harper & Scinto

(57) ABSTRACT

The access method comprises the following steps:
i) receiving a request coming from a user for accessing at least one digital document, said request comprising an identifier (303) designating the digital document and an identifier (304) designating said user;
ii) searching locally for at least one collection (C1) containing the identifier (303) of the document and the identifier (304) of the user, each collection (C1, C2) being stored locally in response to a positive verification with regard to at least one condition agreeing to supply the document according to at least one access right linked to the collection; and
iii) in the case of a positive search, supplying said corresponding document (303) to said user (304) thus designated.

18 Claims, 13 Drawing Sheets

METHOD AND DEVICE FOR CONTROLLING ACCESS TO A SHARED DOCUMENT IN STATION-TO-STATION COMMUNICATION NETWORK

BACKGROUND OF THE INVENTION

The present invention relates to controlling access to a shared document in a communication network of the "station-to-station" or distributed type, commonly referred to as having "peer to peer" topology.

Over the last few years, station-to-station networks have become an alternative to client/server networks, widespread until now. This is because, through their distributed architecture, station-to-station networks make it possible to share a large number of digital data items between a large number of users, without also requiring an expensive infrastructure.

In practice, in a station-to-station network, each station acts as client and server. Thus, each station can request a digital data item or document from any other station whatsoever on the network and the data exchange can take place directly from one station to another.

Subsequently, the term "digital document or data item" applies to both digital images or videos, or also to digital texts or the like.

Thus, in a station-to-station file exchange, each station can be both client and server.

This means that the digital data received by a client can be supplied to other users by the server of this client.

Digital data accessed by many people can therefore be replicated on a number of machines and supplied by more servers.

The system therefore adapts on its own to demand and the communication and storage costs are distributed between all the servers.

On the contrary, in a conventional client/server system, the data are supplied by a single server or by a set of machines fixed in advance.

The capacity of these conventional servers must be proportioned in advance which leads either to over-proportioning (the cost of the server is then too high), or to under-proportioning (the data are not supplied sufficiently quickly).

Another advantage of the station-to-station system is that the digital data are supplied directly from the machines of the users.

The storage space can therefore be considered in practice as unlimited.

However, station-to-station networks are unstable. This is because client devices (and consequently server devices) periodically connect to or disconnect from the network, thus making the presence of data highly uncertain. Moreover, the addresses of the client and/or server devices are unpredictable and liable to be different at each connection.

The result of this is that accessing the contents in a station-to-station type communication network also constitutes a great difficulty since the latency time for obtaining the data item is no longer due simply to the time necessary for retrieving the data as in the conventional client/server topology, but also the time for searching for a server device having this data item available. Depending on the topology of the station-to-station network concerned, this search phase can be non-negligible.

In order to remedy these drawbacks, a known solution consists of using a central server that guarantees a minimum quality of service. Such a solution is referred to as using Hybrid station-to-station networks.

In a known manner, sharing a digital data item through a hybrid station-to-station communication network consists of the sequence of the following steps:

selecting the document to be shared;

associating a unique identifier making it possible to find the location of the document in the network;

calculating a thumbnail image from the original data item;

updating an index table at the central server by associating an identifier of the shared document with one (or more) station(s), each of these stations being a server for this document.

This series of known steps is used in the majority of station-to-station networks for sharing a document with a community of users, that is to say that anyone can access this shared document from the moment this person knows the identifier. This is referred to as public sharing.

On the other hand, a document can be shared with a group of friends and the accessing of this document restricted to this group of friends. This is referred to as restricted access sharing (private sharing).

In this case, the private sharing of a document requires two additional steps:

selecting the addressees; and sending notification to each of these addressees so as to inform them that a new document is capable of being shared.

In practice, the present invention finds a preferred, but non-limiting, application in a hybrid distributed communication network with restricted sharing.

Unlike conventional client/server systems, the shared data item in a station-to-station network is available on a number of servers, which increases the risk of malevolent operations with regard to the access to this data item thus shared.

It is therefore necessary to put in place an access control adapted to the sharing of this data item on each server.

In practice, each server is a machine belonging to a user who must be able to totally control what takes place on his machine. For example, a user must be able to verify what is stored locally. He must also be able to restrict the access to a data item on his machine or alternatively share it with other users.

The putting in place of such an access control mechanism restricts the number of servers who agree to supply a data item to a user, which is contrary to the main advantage of the station-to-station system where a data item in great demand can be supplied by many servers.

The Applicant was faced with the problem of providing an access control adapted to the sharing of a document in a station-to-station network which does not reduce too greatly the number of servers available for a user while being relatively efficient, not very expensive and simple to put in place.

SUMMARY OF THE INVENTION

The present invention provides precisely a solution to this problem.

It concerns a method of accessing a digital document in a communication network, in particular of the station-to-station type, capable of exchanging data in the form of collections, a collection comprising at least one identifier designating a digital document and at least one identifier designating a user having the right to access the documents in this collection, said method being implemented in a station.

According to a general definition of the invention, the method comprises the following steps:

i) receiving a request coming from a user for accessing at least one digital document, said request comprising an identifier designating the digital document and an identifier designating said user;

ii) searching locally for at least one collection containing the identifier of the document and the identifier of the user, each collection being stored locally in response to a positive verification with regard to at least one condition agreeing to supply the document according to at least one access right linked to the collection; and iii) in the case of a positive search, supplying said corresponding document to said user thus designated.

Such an access control method has the advantage of being relatively efficient, not very expensive, and simple to put in place, compared with solutions consisting for example of storing on the central server all the rights of access to each document.

Moreover, the method according to the invention gives the user the possibility of controlling the access to his machine.

According to one embodiment, the method comprises, in the case of a negative search at the end of the step ii), the following step:

ii1) obtaining at least one collection containing said identifier of the document and the identifier of the user and locally storing said collection thus obtained if the supply agreement condition is validated.

In practice, the method also comprises a step i1) of verifying the identity of the sender of the access request, established by means of a chosen authentication function.

Moreover, it is also practical to associate with the request for accessing a digital document a collection identifier comprising the identifier of the requested document. This will make it possible to speed up the local verification of the supply agreement.

According to another embodiment, the step i) is preceded by the following steps:

a) creating each collection by designating each digital document to be shared by an identifier and assigning to each addressee user an access right formed by an identifier of said addressee user;

b) forming a notification containing said collection thus created; and c) sending said notification thus formed to at least one addressee user.

In practice, the receipt of a notification is followed by a step of authenticating each collection thus received according to a chosen authentication function.

In the case of negative authentication of the collection, provision is made to destroy the collection thus received.

In the case of positive authentication of the collection, provision is made to verify the access right associated with the condition agreeing to supply the document and in the case of positive verification to locally store said collection thus received.

According to another embodiment, in the case of an invalid access right, the method also comprises the following steps for each document in the collection:

1) searching locally for the presence of another collection containing at least the identifier of a document belonging to the collection thus received;

2) in the presence of another collection containing at least the identifier of a document belonging to the collection thus received, verifying the validity of the access right associated with the condition agreeing to supply the document of said other collection; and 3) in the case of validity of said access right, locally storing the collection thus received.

In practice, in the case of failure of the step 3), the method also comprises viewing of the collection and, in the case of manual validation of the collection, local storing of said collection.

According to another aspect of the invention, the digital document belongs to the group formed by fixed images or photographs, video sequences, computer files for office automation application or the like.

For example, the access right linked to the collection relates to the author of the collection and the belonging of said author to a chosen list of users referred to as friends, the access right being valid when the author of the collection belongs to such a list of friends.

Another object of the present invention is a device for accessing a digital document in a communication network, in particular of the station-to-station type, capable of exchanging data in the form of collections, a collection comprising at least one identifier designating a digital document and at least one identifier designating a user having the right to access the documents in this collection, said device being incorporated in a station.

According to another important characteristic of the invention, the access device comprises:

means for receiving a request coming from a user for accessing at least one digital document, said request comprising an identifier designating the digital document and an identifier designating said user;

means for searching locally for at least one collection containing the identifier of the document and the identifier of the user, each collection being stored locally in response to a positive verification with regard to at least one condition agreeing to supply the document according to at least one access right linked to the collection; and means for supplying, in the case of a positive search, said corresponding document to said user thus designated.

Another object of the present invention is a system for accessing a digital document in a communication network, in particular of station-to-station type, characterized in that it comprises an access device incorporating the device mentioned above.

Another object of the present invention is an information carrier readable by a computer system, possibly totally or partially removable, in particular a CD-ROM or magnetic medium, such as a hard disk or a floppy disk, or a transmittable carrier, such as an electrical or optical signal, characterized in that it comprises instructions of a computer program allowing the implementation of a processing method mentioned above, when this program is loaded and executed by a computer system.

Finally, an object of the present invention is a computer program stored on an information carrier, said program comprising instructions allowing the implementation of a processing method mentioned above, when this program is loaded and executed by a computer system.

BRIEF DESCRIPTION OF THE DRAWINGS

Other characteristics and advantages of the invention will emerge in the light of the following detailed description of the drawings in which.

DETAILED DESCRIPTION OF THE INVENTION

Figure 1:
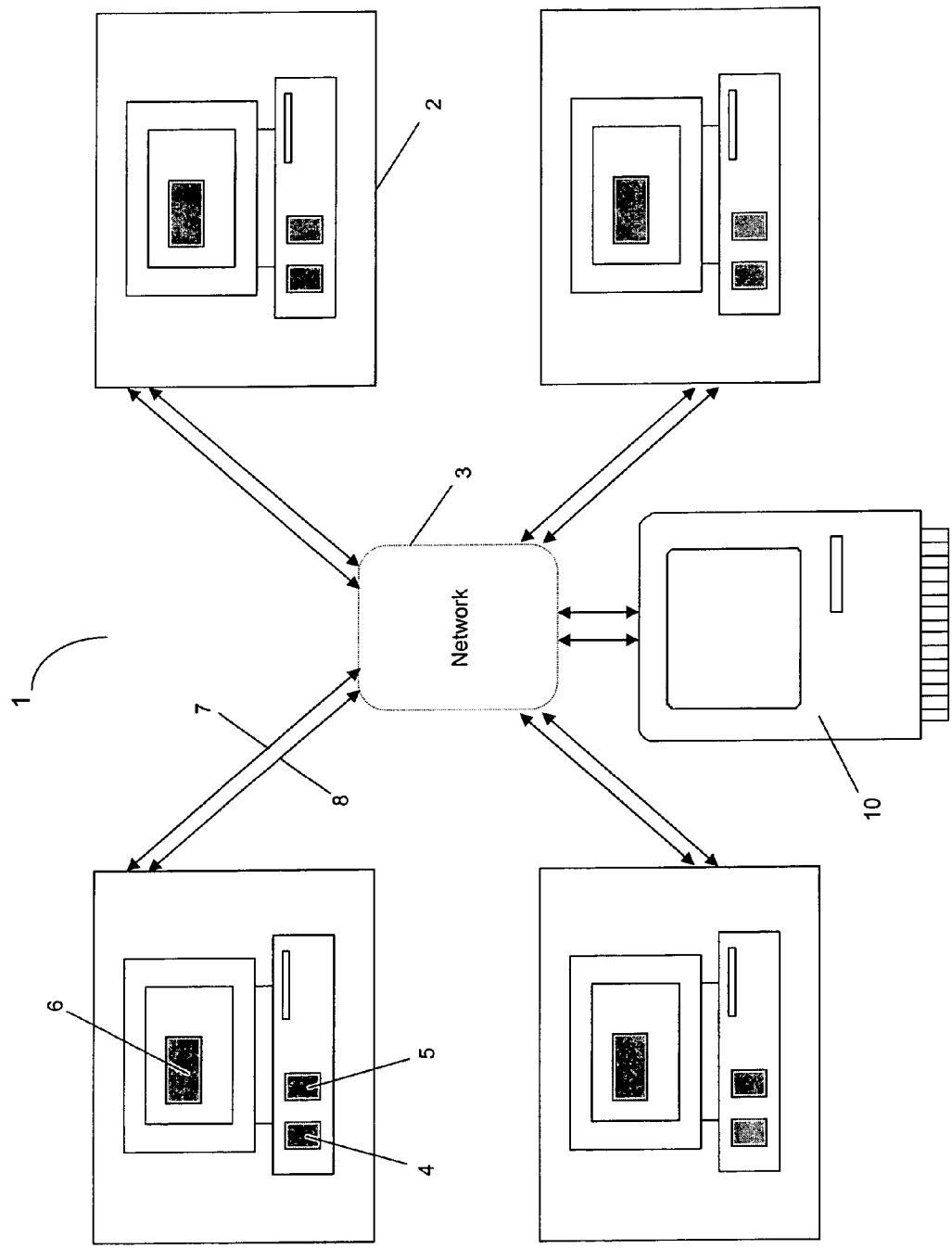
FIG. 1 depicts schematically a station-to-station distributed data exchange network.

With reference to FIG. 1, a distributed data exchange network 1 of the "peer to peer" type has been depicted schematically. Such a network 1 comprises a set of terminals 2, each terminal 2 being connected to the network 3 (the Internet) and having communication means. Each terminal 2 can be for example a device as described in FIG. 2, and comprises in particular: a volatile storage memory (cache) 4, a file server 5 and a man/machine interface 6 which allows communication of the requests 7 of the user and the responses 8 to said requests 7. The terminals 2 can communicate directly by means of the global network 3. Optionally, there can be a central server 10, to which there are connected all the terminals 2 of the distribution network, which is permanently connected and which stores a set of data on the terminal-to-terminal exchange system: information on the presence of each of the terminals identified as forming part of the network, and possibly information on the contents (e.g. the images) that are stored locally on each station. The central server 10 can also be used to authenticate the users who connect up.

Figure 2:
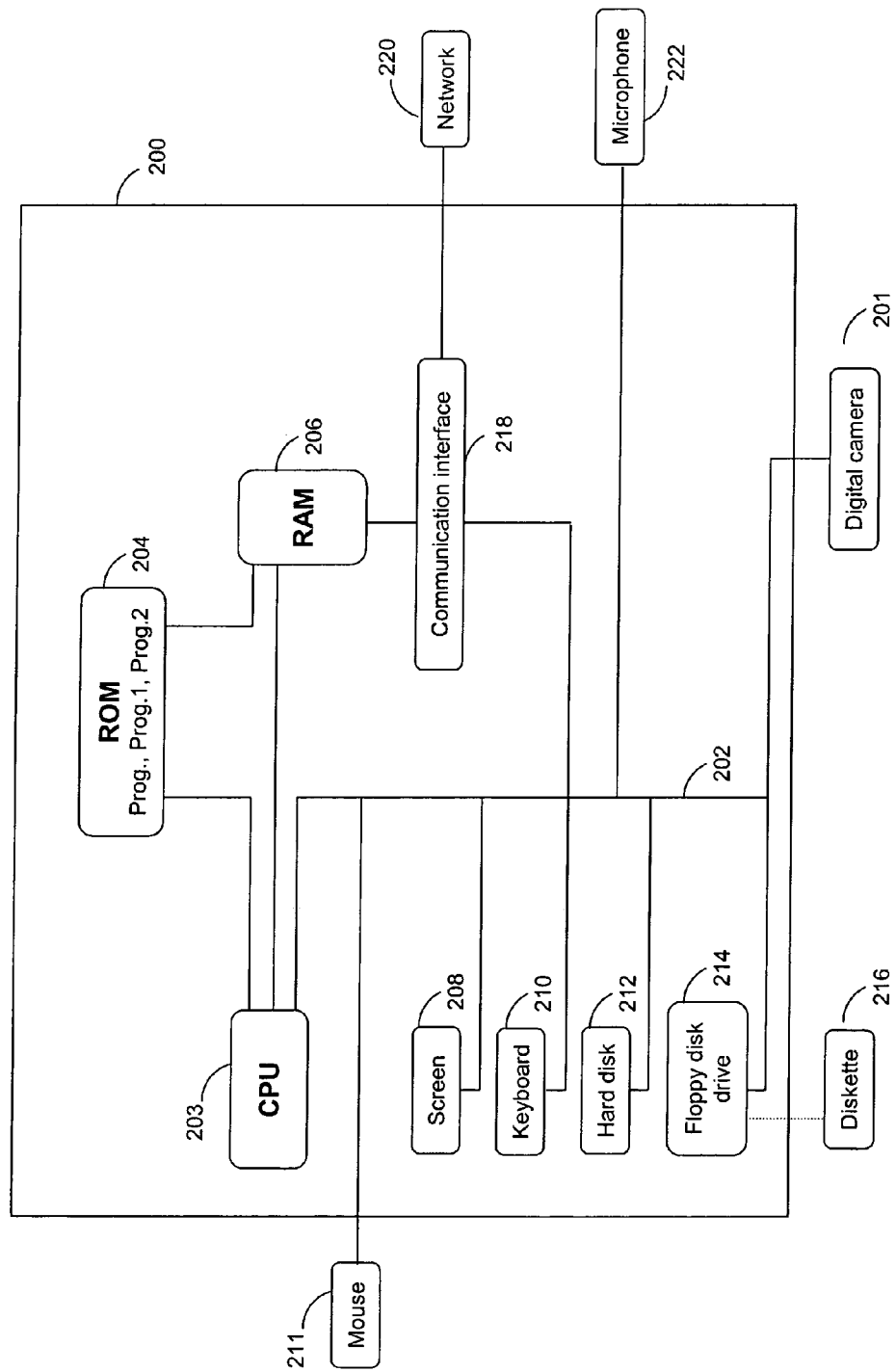
FIG. 2 depicts schematically an apparatus implementing the access method according to the invention.

With reference to FIG. 2, an access device 200 capable of implementing the invention has been depicted. Such an apparatus 200 is for example a microcomputer, a workstation, a digital assistant, a photographic apparatus or a portable telephone. The apparatus 200 is connected to various peripherals such as, for example, a digital camera 201 (or a scanner or any image acquisition or storage means) connected to a graphics card and providing the apparatus with multimedia data.

The apparatus 200 comprises a communication bus 202 to which there are connected:
  a central processing unit 203 (microprocessor);
  a read-only memory 204, possibly comprising the programs "Prog", "Prog1" and "Prog2";
  a random access memory 206 (cache memory), comprising registers adapted to record variables and parameters created and modified during execution of the aforementioned programs;
  a screen 208 making it possible to view data and/or be used as a graphical interface with the user who can interact with the programs according to the invention, using a keyboard 210 or any other means such as a pointing device, like for example a mouse 211 or a light pen; and
  a communication interface 218 connected to a distributed communication network 220, for example the Internet, the interface being capable of transmitting and receiving data.

In the case of audio data, the apparatus also comprises an input/output card (not depicted) connected to a microphone 222.

The apparatus can optionally have:
  a hard disk 212 possibly comprising the aforementioned programs "Prog", "Prog1" and "Prog2";
  a floppy disk drive 214 adapted to receive a floppy disk 216 and read therefrom or write thereto data processed or to be processed according to the invention.

The communication bus allows communication and interoperability between the different elements included in the microcomputer 200 or connected thereto. The depiction of the bus is not limiting and, in particular, the central unit is able to communicate instructions to any element of the microcomputer 200 directly or by means of another element of the microcomputer 200.

The executable code of each program allowing the programmable apparatus to implement the processes according to the invention can be stored, for example, on the hard disk 212 or in read only memory 204.

According to a variant, the floppy disk 216 can contain data and the executable code of the aforementioned programs which, once read by the apparatus 200, will be stored on the hard disk 212.

In a second variant, the executable code of the programs can be received by means of the communication network 220, via the interface 218, in order to be stored in a manner identical to that described previously.

The floppy disks can be replaced by any information medium such as, for example, a compact disk (CD-ROM) or a memory card. In general terms, an information storage means, readable by a computer or by a microprocessor, integrated or not with the apparatus, and possibly removable, is adapted to store one or more programs whose execution allows the implementation of the method according to the invention.

In more general terms, the program or programs can be loaded into one of the storage means of the apparatus 200 before being executed.

The central unit 203 will control and direct the execution of the instructions or portions of software code of the program or programs according to the invention, instructions which are stored on the hard disk 212 or in the read only memory 204 or else in the other aforementioned storage elements. During power-up, the program or programs that are stored in a non-volatile memory, for example the hard disk 212 or the read only memory 204, are transferred into the random access memory (RAM) 206 which will then contain the executable code of the program or programs according to the invention, as well as registers for storing the variables and parameters necessary for implementation of the invention.

It should be noted that the communication apparatus comprising the device according to the invention can also be a programmed apparatus. This apparatus then contains the code of the computer program or programs fixed in an application specific integrated circuit (ASIC), for example.

Figure 3:
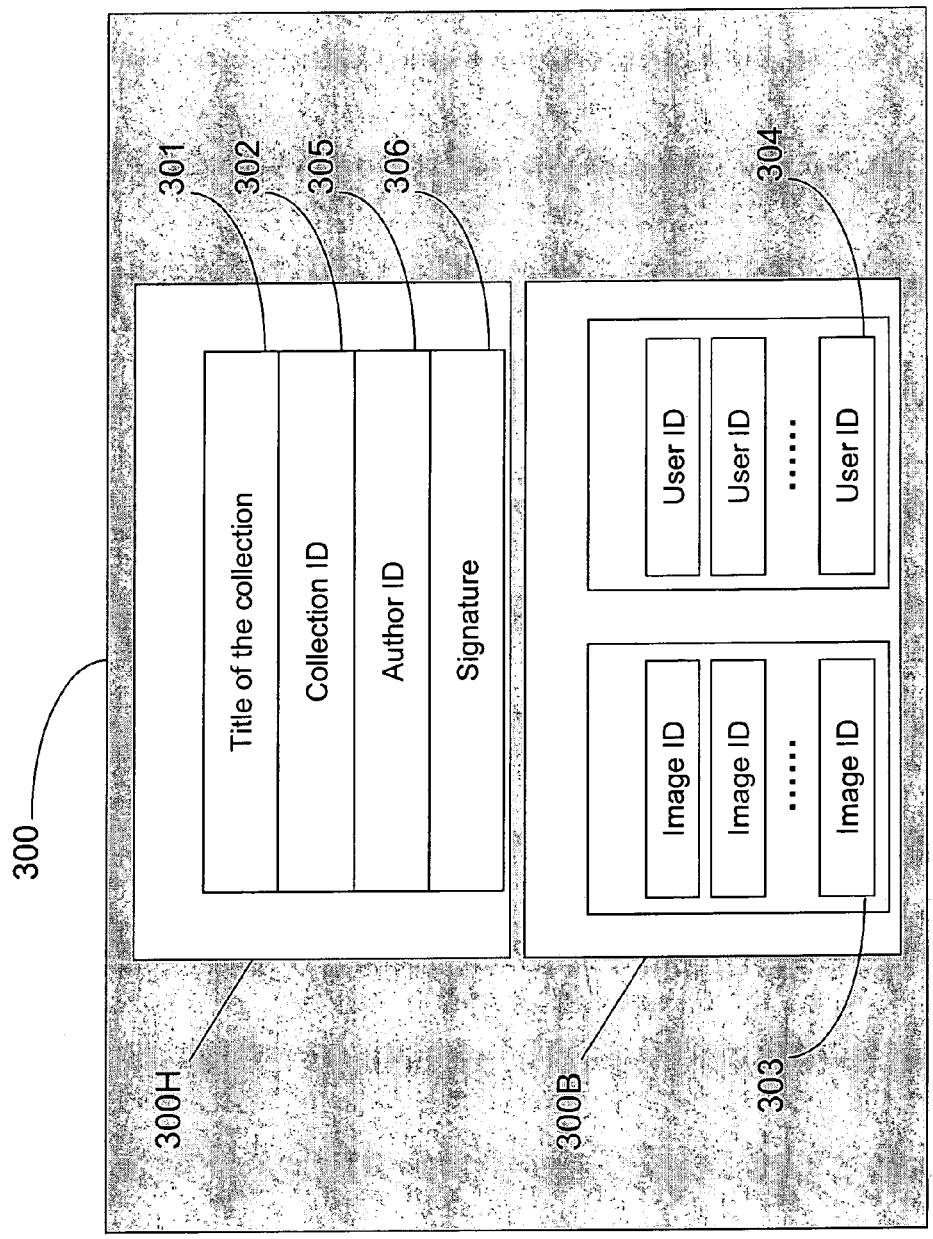
FIG. 3 depicts schematically a collection.

With reference to FIG. 3, a collection 300 comprising a set of contents of media (image, video, sound) with metadata has been depicted. By extension, a collection can contain collections (referred to as sub-collections). In the preferred embodiment, the medium used consists of digital images.

By way of example, a collection 300 comprises:
  on the one hand, a header 300H comprising a title 301, an identifier 302 of the collection, an identifier of the author of the collection 305 and a signature 306; and
  on the other hand, a body 300B comprising a list of identifiers 303 of the digital images in this collection and a list of user identifiers 304.

Each object corresponding to a digital image or to a collection is identified by a unique identifier 302, created on the machine of the user. This identifier is assigned by the client application, even if not connected to the network.

A known solution consists of locally producing random unique numbers. Tools well known to persons skilled in the art make it possible to generate identifiers with a minute probability of duplication.

Similarly, images are defined by a unique identifier 303 by the application of the client as soon as a new image is added to a collection (if the image is copied from an existing collection, it retains the original identifier).

In practice, a thumbnail image has the same identifier as an image. In order to uniquely determine an object (image or thumbnail image), the identifier 303 must be associated with a "typing" or data version: most of the time, this typing is implicit according to the requests sent on the network (in the case of downloading, the image is required, whereas the thumbnail image is useful for simple viewing).

Each user also has a unique identifier 304 provided by the central server 10 during the user registration method. This property is useful for reducing to a minimum the risk of multiple registrations for the same user.

In the preferred embodiment, on purchasing applications software for station-to-station sharing, the purchasing user registers his software and sets up with the central server 10 an account that identifies this user. This account, identified by the identifier ID 304, is used for connection of the client both by the standard software or by an Internet browser.

The creation of a collection by a user is not the subject of the present invention. There exist well-known methods of the prior art which relate to images and their association with image containers. For example, the user can copy an image from the graphics interface of the operating system of his computer and deposit it in the graphics interface of the computer software implementing the invention. The user can structure his images, collections and sub-collections so as to finally record each created collection 300 in the form of a list of identifiers of images, sub-collections and users. In practice, the XML data description format can for example be used. Each collection can possibly comprise one or more items of metadata of small memory size, for example a thumbnail image representing the whole of the collection.

A collection also contains the identifier 305 of the author of the collection and a signature 306 making it possible to verify that the collection was indeed created by the author 305. This signature 306 can be created in a number of ways according to the type of system.

For example, if each user possesses a public key and a private key, the signature 306 can be produced conventionally on the machine of the author with his private key. For example, a summary of the collection can be calculated with a conventional signature algorithm of the "hash" type, for example the "MD5" algorithm, and an encryption of it carried out with the private key.

According to another example, the central server 10 can be used for signing the collection: in this case only the central server 10 needs to have a key. The signature is produced on the central server 10 with its key.

In practice, for validating a signature 306, a client can have the public key corresponding to the key that was used to sign the collection. In this case, he can decrypt the signature 306 and compare the value obtained with his own calculation of the hash of the collection. In a variant, he can call upon the central server 10 for validating the signature.

Figure 4:
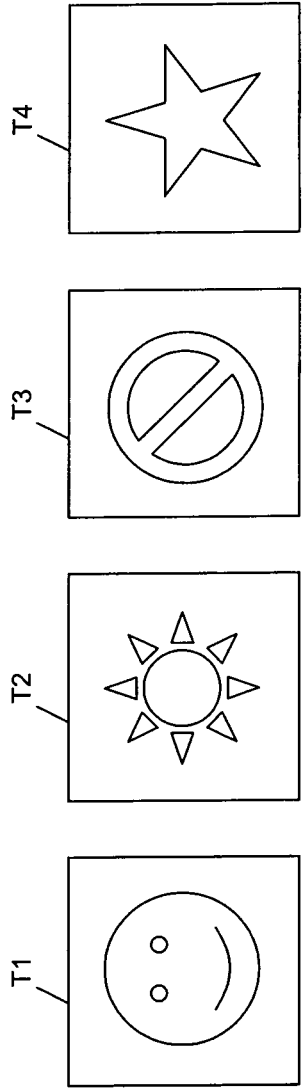
FIG. 4 illustrates the viewing of a collection in a graphics interface.

With reference to FIG. 4, the viewing of a collection file 300 by a user in a graphical interface has been depicted. By analogy with electronic mail, the author 305 is displayed in a "from" field P1 and the addressees are displayed in "to" fields P2. The name displayed is not necessarily the unique identifier 305; it can be a display name associated with registration. A display name can be for example an e-mail address of the user. The title 301 of the collection is also displayed in correspondence at the field P3. For each image included in the collection 300, a thumbnail image T is displayed. By clicking on the thumbnail image T, the user can display the complete image.

Not all the elements making up the collection file are displayed: certain elements are used only for ensuring the coherence of the collection: the signature of the collection, or the collection identifier.

Figure 5:
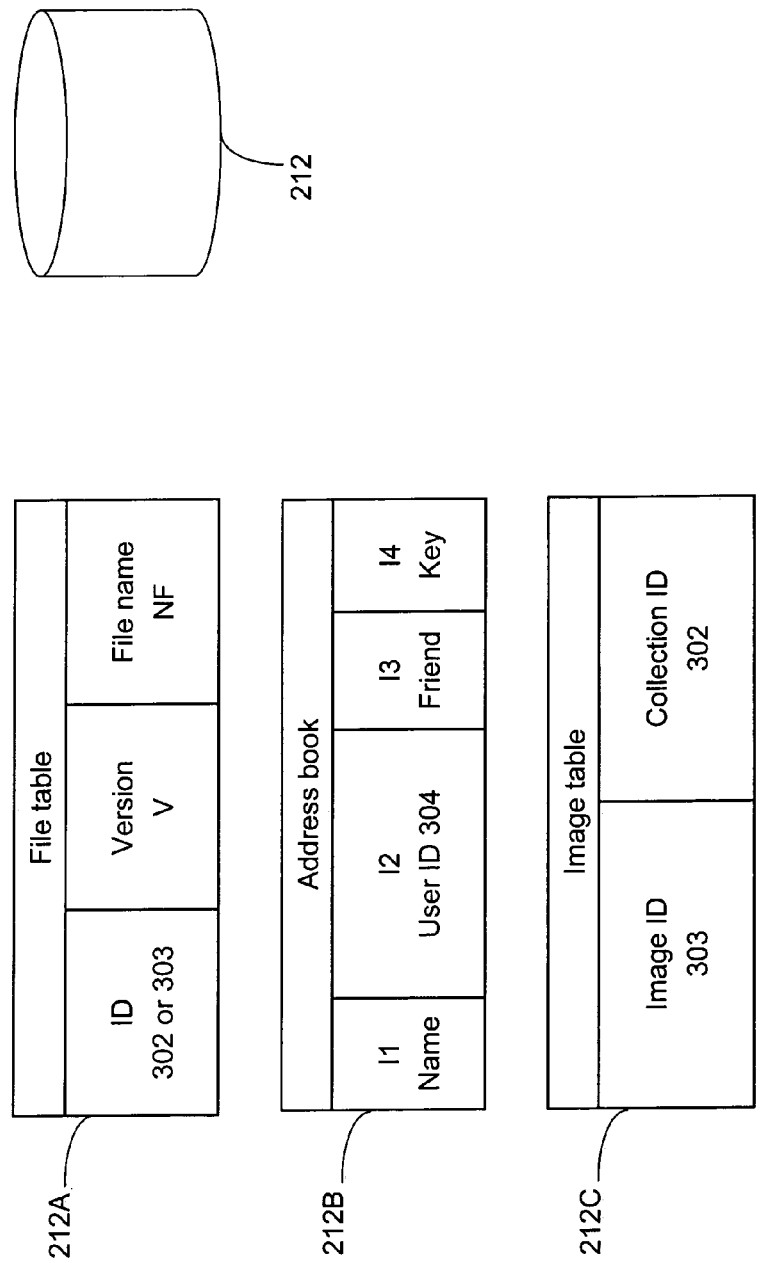
FIG. 5 depicts schematically the data stored at a client station according to the invention.

With reference to FIG. 5, the set of data stored in the storage memory (hard disk 212) of a client station has been depicted.

A client or user stores images and collections in the file system. It must be possible for the image and collection files to be found again from the corresponding identifier 302 or 303; a table 212A is therefore provided associating the unique identifier 302 or 303 in the network with the local file name NF. A record in the file table 212A is created when a file is received from the network and saved locally. The table 212A also contains information V relating to the version of the file.

A second table 212B is provided for containing an address book. Such an address book makes it possible to store all the people in the system known by the client. A record in the table 212B contains an indicator I2 corresponding to the unique identifier 304 of the known person, an indicator I1 corresponding to the display name, an indicator I4 corresponding to the public key (if it exists), and an indicator I3 for indicating whether this contact is a friend. Within the context of this invention, a friend is a user of the system who has a privileged role in the definition of the rights of access to the data, as explained later with reference to FIGS. 7 and 8.

A third table 212C makes it possible to store for each image designated by an identifier 303 a list of the collections designated by an identifier 302 containing said image.

Figure 6:
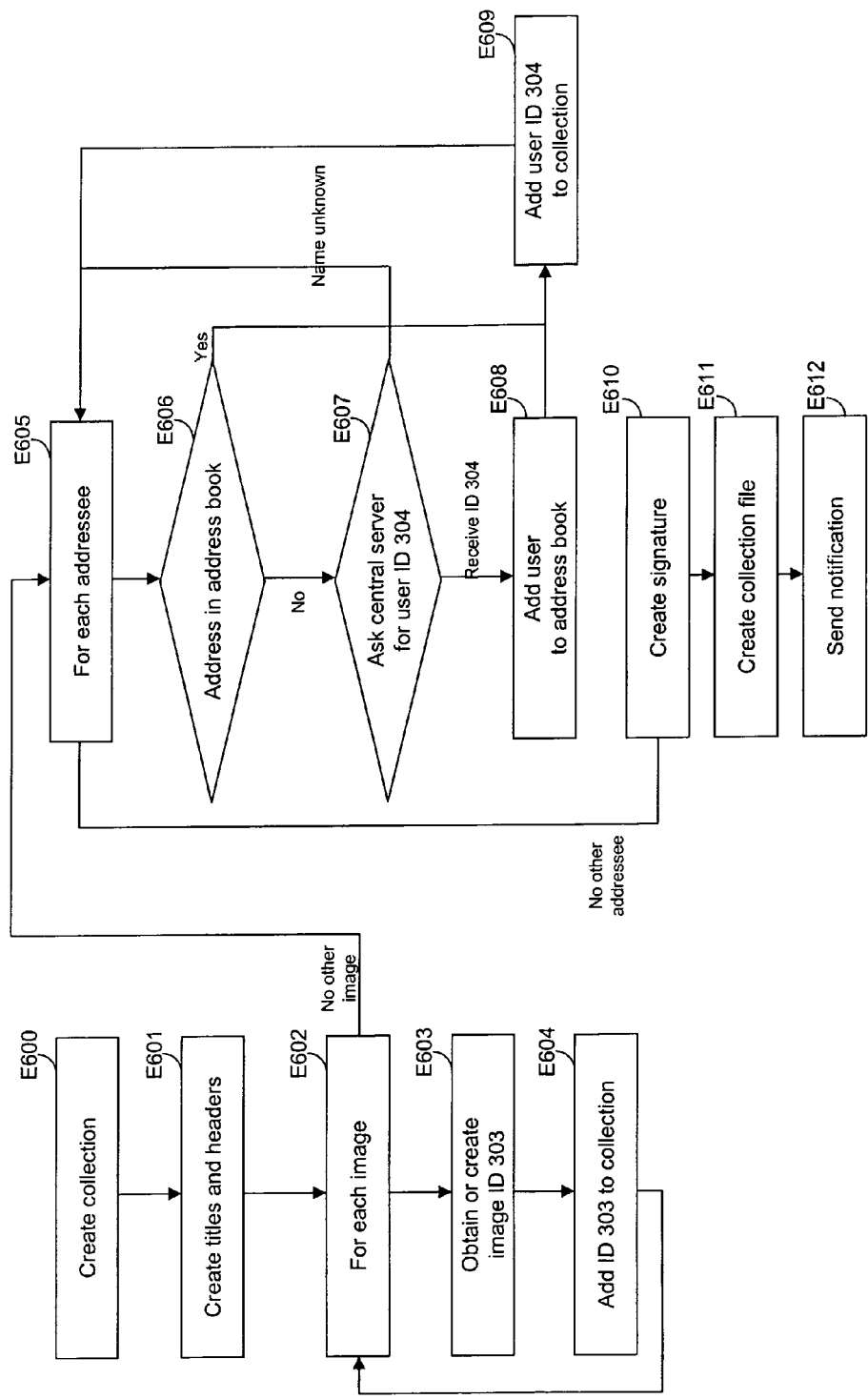
FIG. 6 illustrates schematically the steps in the creation of a collection according to the invention.

With reference to FIG. 6, the steps illustrating the creation of a collection (E600) have been depicted.

During the step E601, the headers 300H of the collection are created; the user enters a title 301, the identifier of the author 305, and the creation date. A new collection identifier 302 is created.

The user next selects an image list (step E602). This can relate to images situated in collections or new images of the user.

For each image, the client obtains an identifier 303 (step E603). This can be the identifier of the image in the collection where it was selected or a new identifier if it concerns a new image. A new identifier can be created by taking for example a random number with a size sufficient to have a very low probability of obtaining the same identifier a number of times.

The identifier of each image is added to the new collection (step E604).

The user next gives addressees (step E605). He can select people from the address book 212B (step E606) or enter new names (step E608). If he has selected a name from the address book 212B, the identifier of the user is known and is added to the addressee list of the collection.

If the user enters a new name, the system then interrogates the central server 10 in order to obtain information on the addressee (step E607). If the addressee is a person registered in the system, the central server 10 has assigned him an identifier 304 which can then be sent back to the client with all the associated information: name I1, public key I4. The client can then add the name into the address book 212B. The system asks the user whether the addressee is a friend. The new user identifier 304 can then be added to the addressee list of the collection.

If the name is not known on the central server 10, he cannot be chosen as an addressee.

After creating the image list and the addressee list, it is possible to calculate a signature (step E610). The signature can be calculated using a conventional public key signature system in which a footprint of the data to be signed (the author, the image list and the addressee list) is calculated using an algorithm such as MD5, and in which this footprint is then encrypted with the private key of the author using an authentication function of RSA type for example. In a variant, the signature can be calculated by the central server. The collection is then sent to the central server which authenticates the person who sent the collection and calculates a signature. The signature is then sent back to the author of the collection.

The collection file can then be stored (step E611). This step E611 consists of saving the new collection in a file. The identifier and the file name are saved in the file table 212A. The image table 212C is updated for each image included in the collection: the identifier 302 of the collection is associated with the identifier 303 of each image. For new images, the file table 212A is updated with the path of the original image, the identifier 303 of the image and the version V.

Finally a message is sent to each addressee to inform him of the new collection (step E612).

Figure 7:
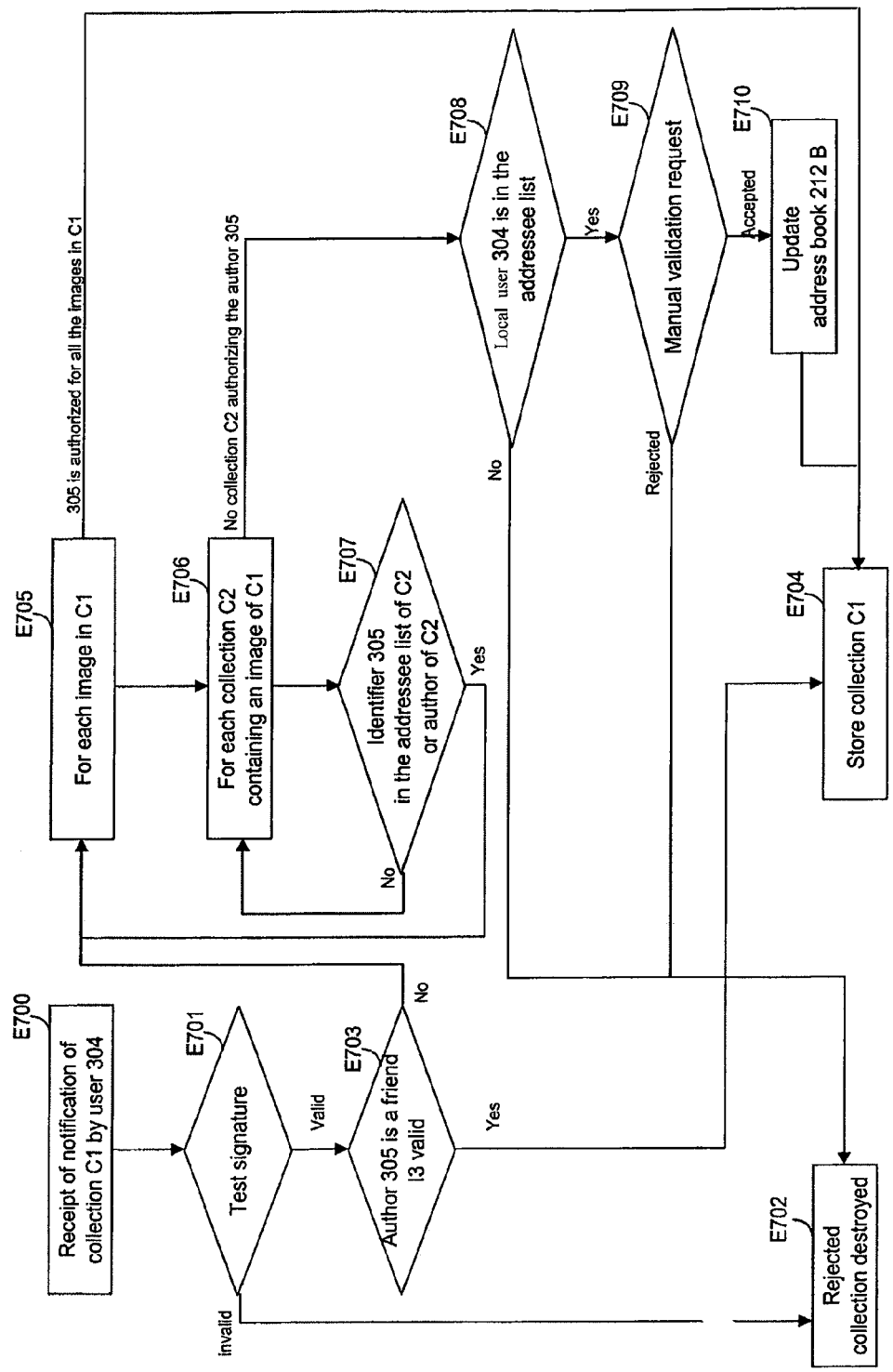
FIG. 7 illustrates schematically the steps in the receiving and acceptance of a collection according to the invention.

With reference to FIG. 7, the steps in the receipt of a new collection C1 (step E700) by a user 304 have been depicted.

First, during the step E701, provision is made to establish an authentication function with regard to the collection thus received.

For example, the signature (306) associated with the collection is verified. For this, the system reads the identity 305 of the author of the collection. If this author is in the address book 212B, his public key 14 can be obtained therefrom. If not, the central server 10 is asked for the public key. This key is used for validating the signature (306) associated with the collection as follows: the signature is decrypted and compared with the footprint of the received collection; if these two data items are identical, the signature associated with the collection is validated. In a variant, the collection C1 can be sent to the central server 10 for it to validate the signature. Another variant consists of using the public key of the central server 10 for validating the signature.

If the signature (306) associated with the collection is invalid, the collection C1 is rejected and is not stored (step E702).

If the signature (306) associated with the collection is valid, the system checks whether the author of the collection designated by his identifier 305 is a friend (step E703). In other words, the system checks whether the author designated by his identifier 305 belongs to the address book 212B with an indicator I3 corresponding to the valid "friend" criterion. In the case of a valid criterion I3, the collection C1 can be accepted and the collection file stored (step E704).

If the author designated by the identifier 305 is not a friend (criterion I3 not valid), the method can continue the access control mechanism by checking whether the author of the collection C1 designated by the identifier 305 is authorized to access all the images in the collection C1 according to at least one collection C2 already accepted locally (step E705).

For this, the method checks, for each image designated by its identifier 303 in the collection C1, whether there exists at least one local collection C2 that contains the corresponding image and that authorizes the author designated by the identifier 305 (step E706), that is to say either the author 305 is the author of the collection C2, or the author 305 forms part of the addressee list of the collection C2 (step E707).

If the result of the step E707 is positive for each image in the collection C1, then the collection C1 can be accepted and stored (step E704).

If the collection C1 is still not accepted, the system checks (step E708) whether the local user 304 is in the addressee list of the collection C1. If this is not the case, the collection C1 is rejected (step E702). Such a test is in particular useful for checking whether the user is able to obtain a graphical representation so that the user can validate the collection C1.

If the user forms part of the addressee list, the system then asks (step E709) the user to manually validate the collection C1. The collection C1 is presented graphically to the user who can accept or reject it.

If he rejects it, the collection is destroyed. If he accepts it, the system can ask (step E710) whether the author designated by his identifier 305 must be added to the address book 212B and whether he is a friend (indicator I3 in the valid state), and then the collection is stored.

The saving of the collection C1 updates the associated tables 212A, 212B and 212C in the same way as in the case of the creation of a new collection as described with reference to FIG. 6.

The user can at any time ask to view a stored collection. In this case a graphical representation of the collection is presented to him. A thumbnail image is presented for each image in the collection. If the thumbnail image is not available locally, the system searches for it in the network. For example, the client can send requests for accessing the image to the known clients. If one of the clients agrees to supply the data item as described with reference to FIG. 8, the new data item is stored in a local file, the tables 212A, 212B and 212C are then updated: the new file is put in the file table 212A with the image identifier 303 and the version V.

If then the user asks to view the original version of a data item in the collection, if this data item is not available locally then the data item is searched for in the network and if it is found it is downloaded and stored: the tables 212A to 212C are updated which will make it possible to supply this data item if another client requests it.

Figure 8:
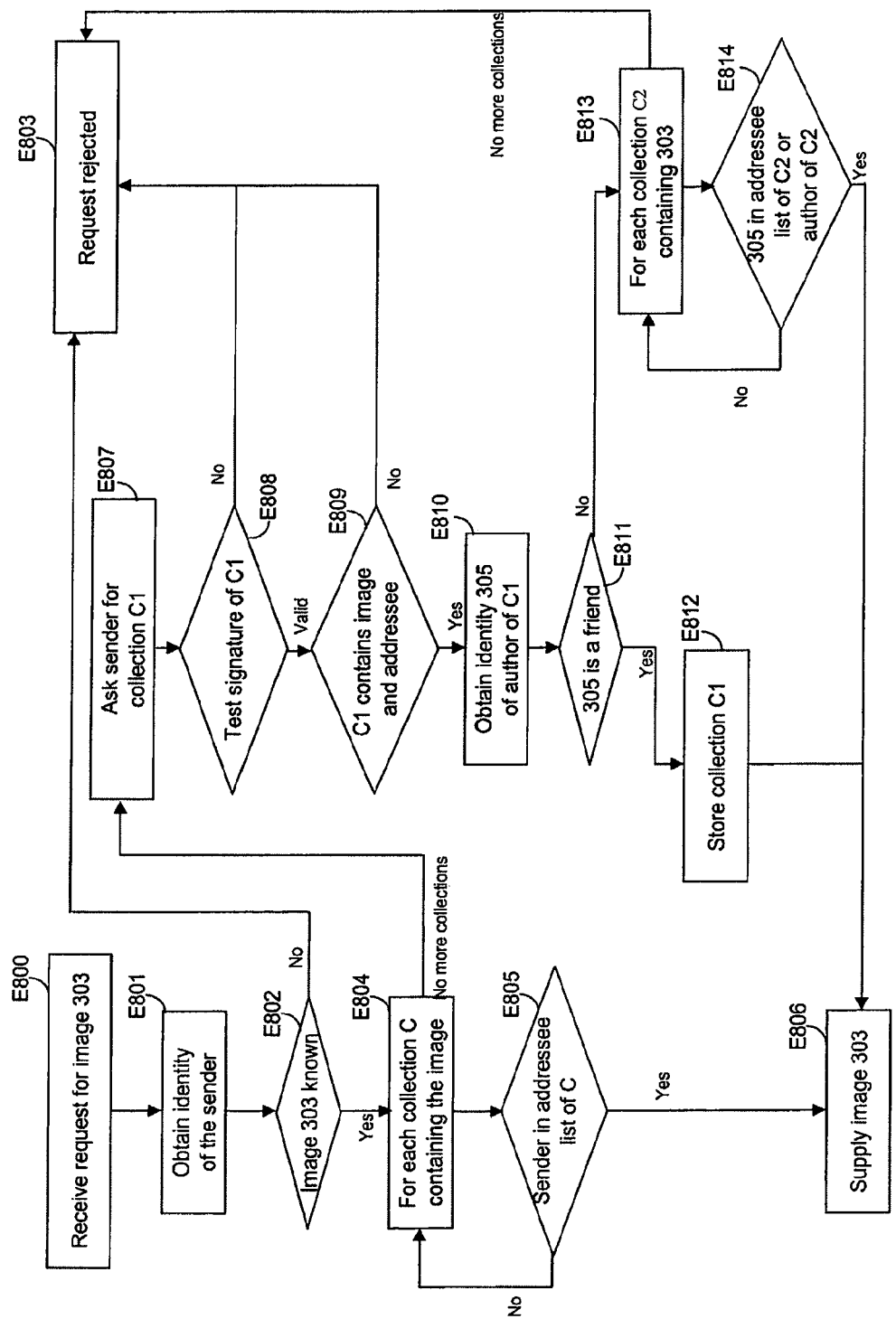
FIG. 8 illustrates schematically the steps in a request for accessing an image according to the invention.

With reference to FIG. 8, the steps in the receiving of a request to supply an image designated according to its identifier 303 (step E800) have been described.

During the step E801, the method tests the validity of the identity of the sender of the request. The identity of the sender can be put in the request but it is preferable to verify the validity of this identity. One solution consists of using the public key of the sender (which can be obtained from the central server) for encoding a request sent to the sender. If the latter is capable of decoding it, this shows that he possesses the private key and that he therefore indeed has the correct identity.

Another variant consists of the sender requesting a token from the central server 10. The latter verifies his identity by asking him for a password. It can then give him a token created with the private key of the central server 10 which encodes the identity of the sender. The receiver of the request can thus validate the identity by decoding the token which requires only the public key of the central server.

During the step E802, it is checked whether the image designated by its identifier 303 is known by using the file table 212A. If the image is not known, the request is rejected (step E803).

Next the system uses the image table 212C to obtain the list of collections containing the requested image (step E804). For each collection containing the designated image, it is checked whether the sender of the request is in the addressee list of the collection (step E805). If this is the case, the image is sent to the requester (step E806).

In a variant, a collection identifier 302 can be included in the image request in order to speed up the search for a collection containing both the image and the identity of the requester. This collection would be tested first before all the other collections containing the image.

If no locally known collection authorizes the requester to obtain the image, he is then asked to send the collection C1 that allowed him to find the image designated by the identifier 303 (step E807). When this new collection C1 is received, the collection C1 is validated using part of the algorithm described with reference to FIG. 7. First, the signature of the collection C1 is checked. If the signature is not valid, the request is rejected (step E803).

Then it is checked whether the image designated by the identifier 303 forms part of the list of images in the collection C1 and whether the requester forms part of the addressee list (step E809).

Finally, the identity of the author (identifier 305) of the collection C1 is extracted (step E810). If the author (identifier 305) is a friend (step E811), the collection C1 is accepted (step E812), stored and the image can be supplied (step E806).

If the author is not a friend (indicator I3 in the non-valid state), it is checked (step E813) whether there exists a collection C2, known locally and already accepted, containing the image designated by the identifier 303 and authorizing obtaining of the image thus designated. In practice, the authorization is granted if the user designated by the identifier 305 is an addressee of the collection C2 or else the author of the collection C2 (step E814).

If such a collection C2 exists (authorization granted according to the step E814), the method authorizes the sending of the image thus designated 303, but the collection C1 is not stored since it could contain authorizations for images other than the image which could be invalid.

In a variant it could be verified that the author of C2 is authorized to access all the images of C2 according to the collections accepted locally and not only the image designated by the identifier 303. In this case the collection C1 can be accepted locally.

If no local collection C2 authorizes the author of the collection C1 to obtain the image 303, the request is rejected (step E803).

Figure 9:
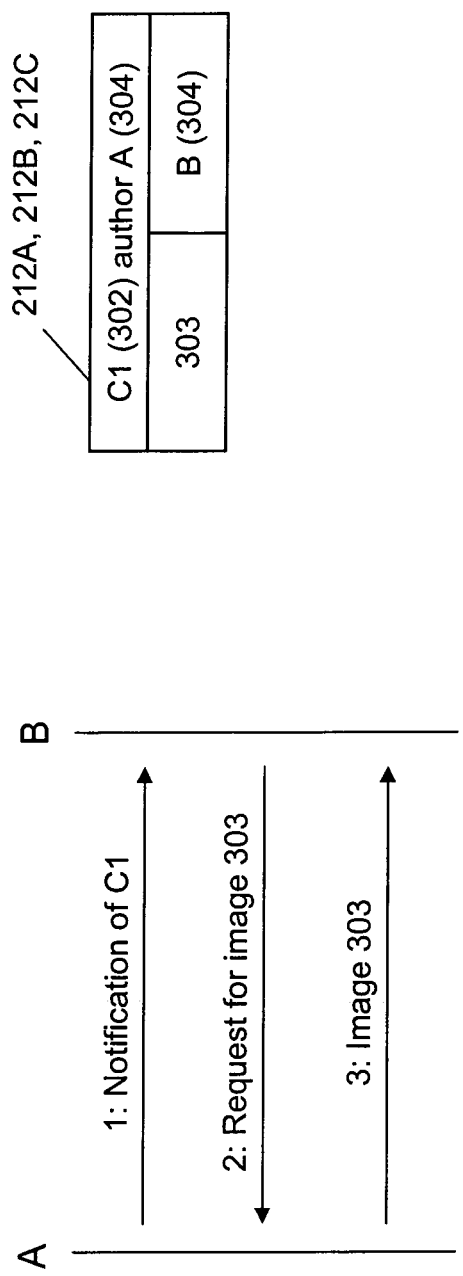
FIG. 9 illustrates simple sharing according to the invention.

With reference to FIG. 9, the normal scenario for sharing a collection C1 has been depicted.

A user A (identifier 304) creates a collection C1 (identifier 302) and puts the user B as addressee. Following the steps described with reference to FIG. 6, the collection file C1 is created, stored locally in the tables 212A to 212C and sent to the user B.

The user B can then ask to view an image in the collection C1. For this, the user B sends a request for the image designated according to an identifier 303 to the user A. Following the steps described with reference to FIG. 8, the user A will agree to supply the image since the user B forms part of a known collection which gives him the right to receive the image thus designated by the identifier 303.

The image 303 is therefore sent to the user B.

Figure 10:
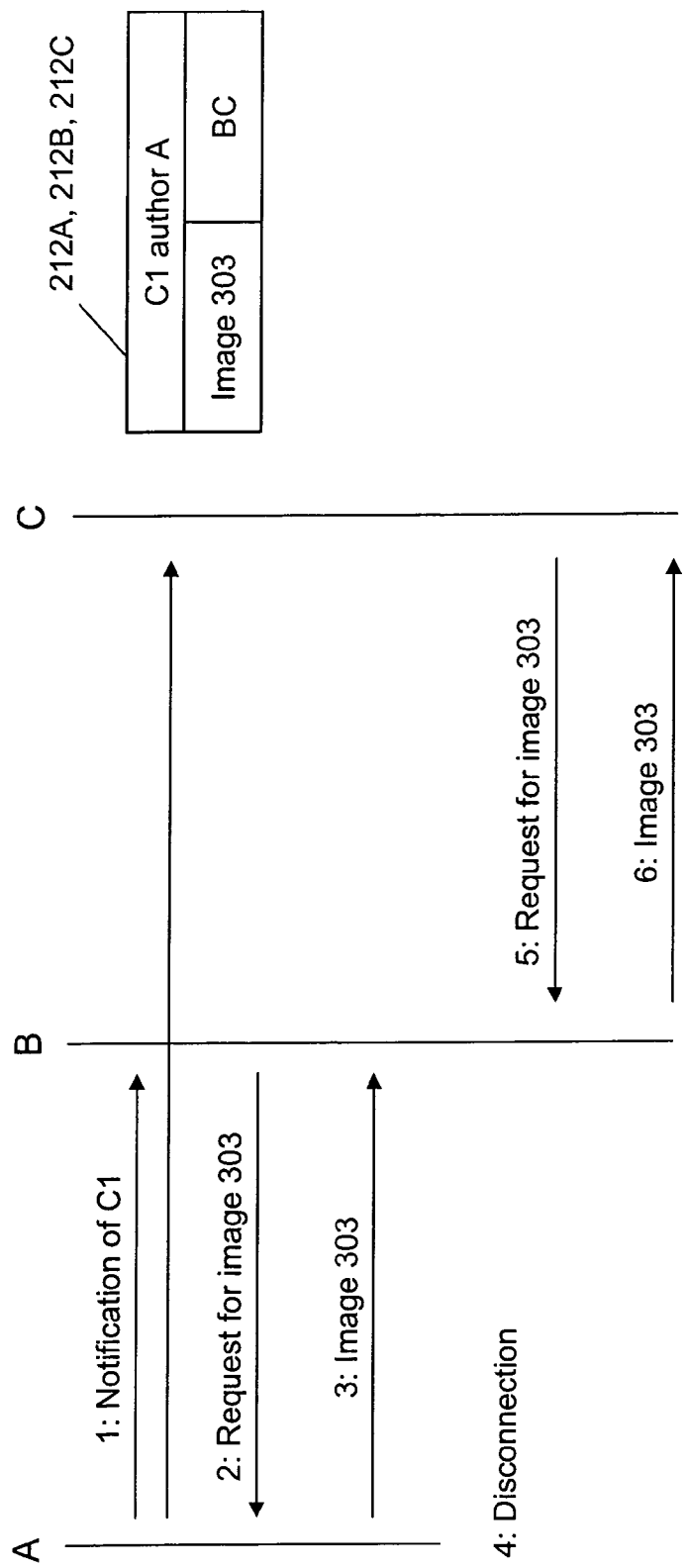
FIG. 10 illustrates sending to a number of addressees according to the invention.

With reference to FIG. 10, the scenario for sending a collection with a number of addressees has been depicted.

A user A creates a collection C1 and puts the users B and C as addressees. Following the steps described with reference to FIG. 6, the collection file is created, stored locally in the tables 212A to 212C and sent to the users B and C.

In this scenario, the user B validates the collection C1 and views an image designated by an identifier 303. The image 303 is therefore downloaded and stored on the station of the user B. Then the user A disconnects from the network.

The user C then asks to access the image 303. If he sends the request to the user B, the user B will note that he possesses a collection authorizing the user C to access the image 303. He will therefore supply the image 303 in the place of the author of the collection C1.

Figure 11:
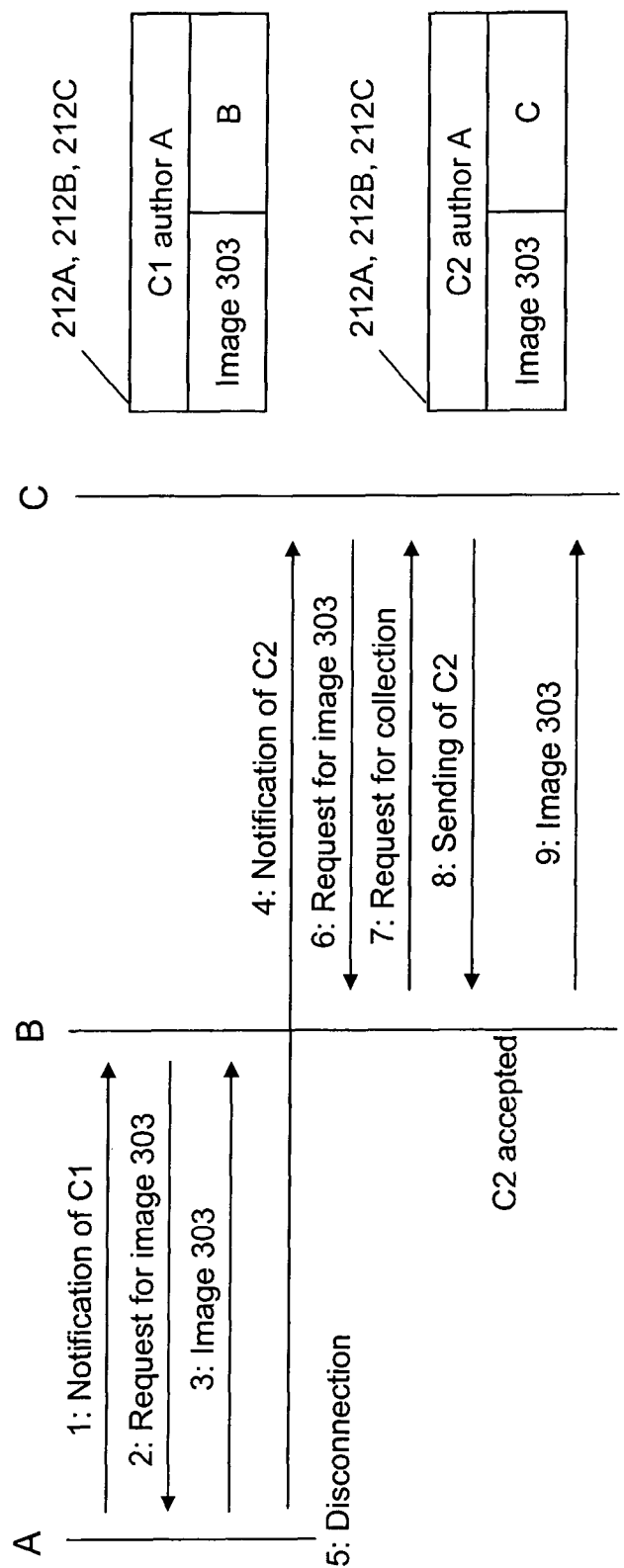
FIG. 11 illustrates sending of a number of collections according to the invention.

With reference to FIG. 11, the scenario for sending a number of collections has been depicted.

A user A creates a collection C1 and puts the user B as addressee. Following the steps described with reference to FIG. 6, the collection file is created, stored locally in the tables 212A to 212C and sent to the user B.

In this scenario, the user B validates the collection C1 and views an image designated by an identifier 303. The image thus designated is therefore downloaded and stored on the station of the user B.

The user A next creates a collection C2 containing the same image (same identifier 303) as the collection C1 and puts the user C as addressee. Following the steps described with reference to FIG. 6, the collection file is created, stored locally (in the tables 212A to 212C) and sent to the user C.

Next the user A disconnects from the network.

The user C then asks to access the image having the identifier 303. If he sends the request to the user B, the user B will note that he does not possess a collection authorizing the user C to access the image 303. He therefore asks him for the collection that authorizes him to obtain the image 303. The user C therefore sends the collection C2.

The user B then applies the steps described with reference to FIG. 8 for validating the collection C2. The collection C2 is validated since the author of C2 (the user A) is also the author of the collection C1 which has already been accepted and which contains the same images.

The user B will note that he possesses a collection authorizing the user C to access the image 303. He will therefore supply the image 303 in the place of the author A of the collection C1.

Figure 12:
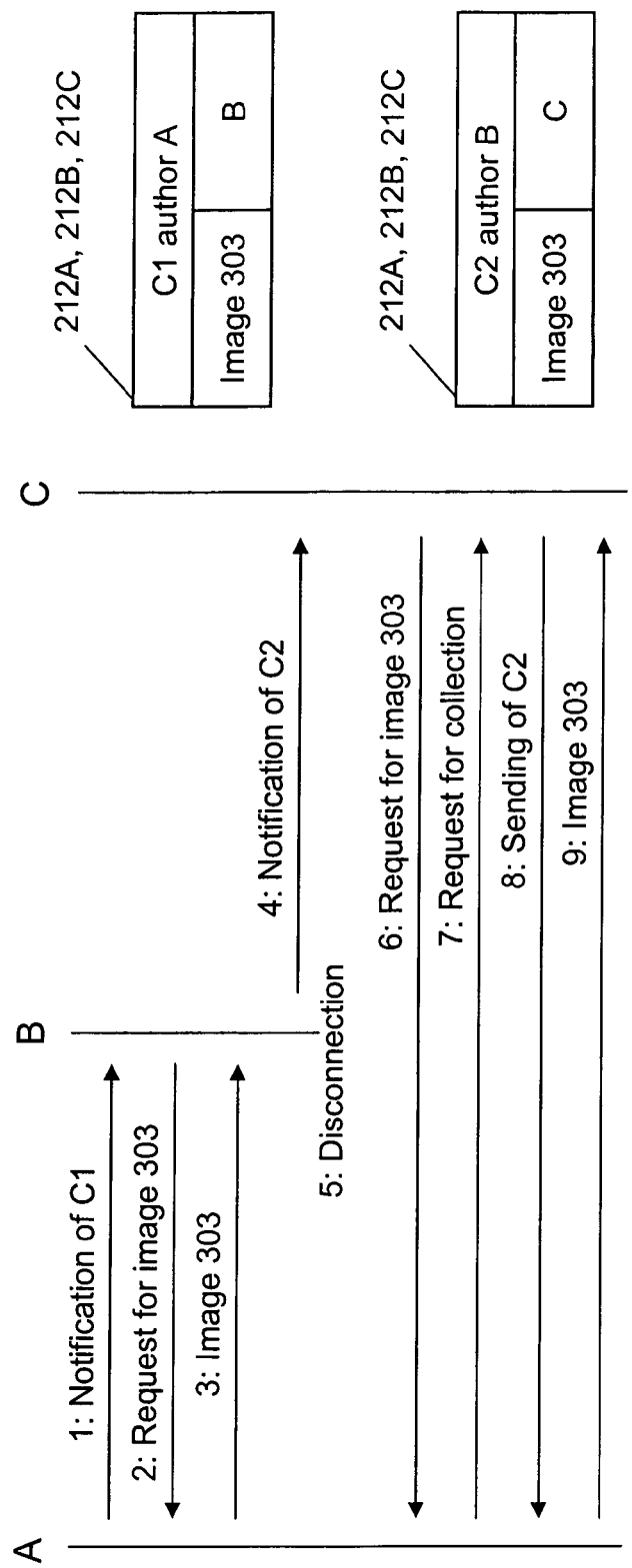
FIG. 12 illustrates a scenario of re-sending of received images to other addressees according to the invention.

With reference to FIG. 12, the scenario for re-sending received images to other addressees has been depicted.

A user A creates a collection C1 and puts the user B as addressee. Following the steps described with reference to FIG. 6, the collection file is created, stored locally (in the tables 212A to 212C) and sent to the user B.

In this scenario, the user B validates the collection and views an image designated by its identifier 303. The image thus designated is therefore downloaded and stored on the station of the user B.

The user B then decides to share the image 303 again with another addressee. He creates a collection C2 containing the same image (same identifier 303) as the collection C1 and puts the user C as addressee. Following the steps described with reference to FIG. 6, the collection file is created, stored locally (in the tables 212A to 212C) and sent to the user C.

The user B next disconnects.

The user C then asks to access the image 303. If he sends the request to the user A, the user A will note that he does not possess a collection authorizing the user C to access the image 303. He therefore asks him for the collection that authorizes him to obtain the image 303. The user C therefore sends the collection C2.

The user A then applies the steps described with reference to FIG. 8 for validating the collection C2. It is assumed that the user B is not a friend of the user A; the collection C2 is not validated.

However the user A can verify that the user B (the author of the collection C2) is authorized to access the image 303, since he possesses a stored collection C1 that gives the user B the right to access the image 303. He therefore agrees to supply the image 303 in the place of the user B, even though the collection C2 is not stored.

Figure 13:
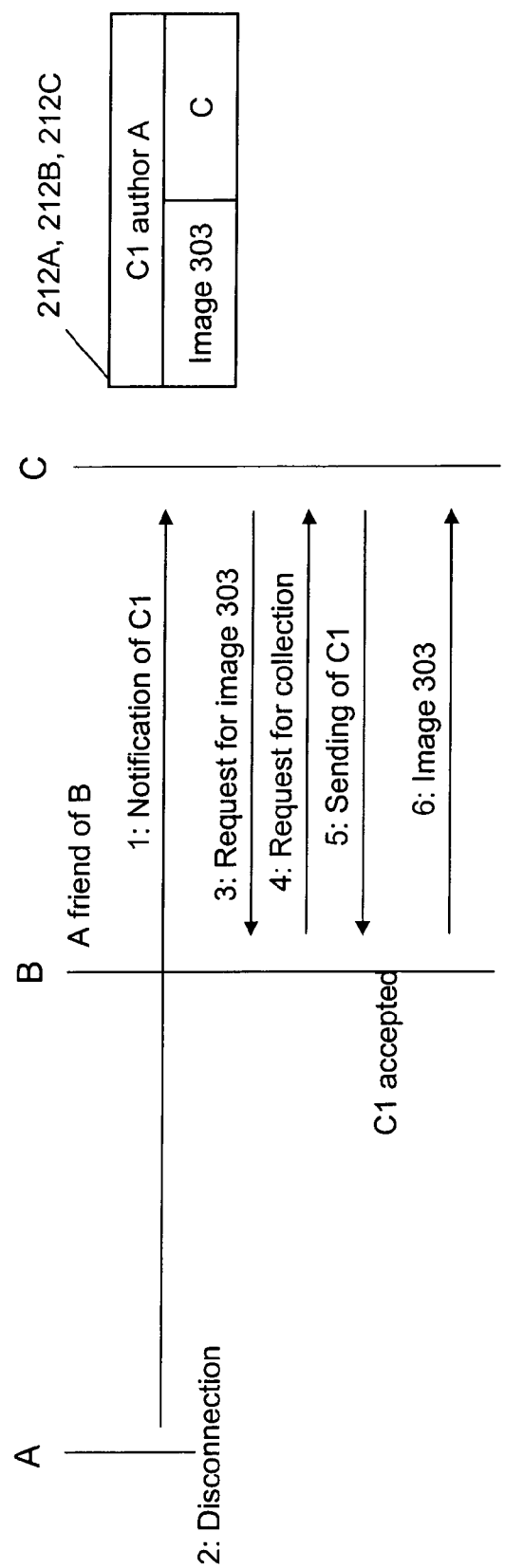
FIG. 13 illustrates a "friends of friends" type access authorization scenario according to the invention.

With reference to FIG. 13, the scenario for authorizing access to friends of friends has been depicted.

A user A creates a collection C1 and puts the user C as addressee. Following the steps described with reference to FIG. 6, the collection file is created, stored locally (in the tables 212A to 212C) and sent to the user C.

The user A next disconnects.

In this scenario, a user B is connected and possesses the image 303 and the user B has the user A as a friend.

The user C validates the collection and then asks to access the image 303. If he sends the request to the user B, the user B will note that he does not possess a collection authorizing the user C to access the image 303. He therefore asks him for the collection that authorizes him to obtain the image 303. The user C therefore sends the collection C1.

This collection is then accepted since the author of the collection C1 is the user A who is a friend of the user B.

The user B will note that he possesses a collection authorizing the user C to access the image 303. He will therefore supply the image 303 in the place of the author of the collection.

The invention claimed is:

1. A method of accessing a digital document in a peer-to-peer communication network, in which peers are capable of exchanging data, said method being implemented in a first peer of the communication network and comprising the following steps:
   i) receiving, from a second peer of the communication network, at least one digital document and a collection comprising at least one document identifier designating the at least one digital document and at least one user identifier designating a user having a right to access any document identified in this collection,
      wherein the at least one digital document represents data items which can be shared with another peer via a peer-to-peer communication, and
      wherein the collection represents meta-data which controls access to the at least one digital document for sharing with another peer;
   i1) verifying at least one condition agreeing to supply from the first peer any document identified in the collection to any user identified in the collection;
   ii) storing locally the at least one digital document and the collection, received from the second peer, in response to a positive outcome of the step, of verifying the at least one condition;
   iii) receiving a request coming from another peer on behalf of a specific user for accessing at least one digital document, the request comprising an identifier designating the document and an identifier designating the specific user;
   iv) searching locally for at least one locally-stored collection containing the identifier of the document and the identifier of the specific user as a user having a right to access any document identified in the at least one locally-stored collection;
   v) in the case of a positive search, supplying the document to the peer; and
   vi) in the case of a negative search, supplying the document to the peer if at least a further condition is verified.

2. A method according to claim 1, further comprising, in the case of a negative search in step iv), obtaining at least one collection containing the identifier of the document and the identifier of the specific user and locally storing the collection thus obtained, if the further condition is validated.

3. A method according to claim 1 or claim 2, further comprising a step iii1) of verifying the identity of the sender of the access request, established by means of a chosen authentication function.

4. A method according to claim 1, wherein the request for accessing a digital document also comprises the identifier of a collection containing the identifier of the requested digital document.

5. A method according to claim 1 or 2, wherein step i) is preceded by the following steps, performed in the following order, in the second peer:
   a) creating a collection by designating at least one digital document to be shared by an identifier and assigning to an addressee user a right to access the document by associating the identifier of the document with an identifier of the addressee user;
   b) forming a notification containing the collection thus created; and
   c) sending the notification thus formed to at least one addressee user.

6. A method according to claim 5, wherein the receipt of a notification in the first peer is followed by a step of authenticating each collection thus received according to a chosen authentication function.

7. A method according to claim 6, wherein, in the case of negative authentication of the collection, provision is made to destroy the collection thus received.

8. A method according to claim 6, wherein, in the case of positive authentication of the collection, provision is made to verify the at least one condition agreeing to supply the document of the collection and locally store the collection thus received.

9. A method according to claim 8, wherein, in the case of a negative verification of the at least one condition agreeing to supply the document of the collection, the method further comprises the following steps for each document in the collection:
   1) searching locally for the presence of another collection containing at least the identifier of a document belonging to the collection thus received;
   2) in the presence of another collection containing at least the identifier of a document belonging to the collection thus received, verifying the at least one condition agreeing to supply the document of the other collection; and
   3) in the case of a positive verification of the at least one condition agreeing to supply the document of the other collection, locally storing the collection thus received.

10. A method according to claim 9, wherein, in the case of failure of step 3), the method further comprises viewing the collection and, in the case of manual validation of the collection, locally storing the collection.

11. A method according to claim 1 or 2, wherein the digital document belongs to the group formed by fixed images or photographs, video sequences, computer files for office automation application or the like.

12. A method according to claim 1 or 2, wherein the at least one condition agreeing to supply the document of the collection relates to whether the author of the collection belongs to a chosen list of users referred to as friends, the condition being valid when the author of the collection belongs to such a list of friends.

13. A method according to claim 1, wherein the collection to be stored also comprises an author identifier designating the author of the collection and wherein said step of verifying the at least one condition further comprises:
   verifying a first condition according to which the author identifier belongs to a chosen local list of user identifiers referred to as "friends";
   in a case where the first condition is not valid, verifying a second condition according to which, for each document identifier of the collection, there exists at least one local collection stored on the first peer that contains the document identifier of the document, and the author identifier in the collection to be stored as either the author identifier or a user identifier of the at least one local collection; and
   in a case where the second condition is not valid, verifying a third condition according to which the identifier of the first peer is one of the user identifiers of the at least one local collection.

14. A method according to claim 13, wherein said step of verifying the first condition further comprises the step of comparing the author identifier with locally stored identifiers.

15. A device for accessing a digital document in a peer-to-peer communication network, in which peers are capable of exchanging data, said device being incorporated in a first peer of the communication network and comprising:
   means for receiving, from a second peer of the communication network, at least one digital document and a collection comprising at least one document identifier designating a digital document and at least one user identifier designating a user having a right to access any document identified in this collection,
   wherein the at least one digital document represents data items which can be shared with another peer via a peer-to-peer communication, and
   wherein the collection represents meta-data which controls access to the at least one digital document for sharing with another peer;
   means for verifying at least one condition agreeing to supply from the first peer any document identified in the collection to any user identified in the collection;
   means for storing locally the at least one digital document and the collection, received from the second peer, in response to a positive outcome of verifying the at least one condition;
   means for receiving a request coming from another peer on behalf of a specific user for accessing at least one digital document, the request comprising an identifier designating the document and an identifier designating the specific user;
   means for searching locally for at least one locally-stored collection containing the identifier of the document and the identifier of the specific user as a user having a right to access any document identified in the at least one locally-stored collection;
   means for supplying, in the case of a positive search, the document to the peer; and
   means for supplying, in the case of a negative search, the document to the peer if at least a further condition is verified.

16. A device according to claim 15, wherein the digital document belongs to the group formed by fixed images or photographs, video sequences, computer files for office automation application or the like.

17. A system for accessing a digital document in a peer-to-peer communication network, comprising an access device incorporating the device according to any one of claims 15 to 16.

18. A non-transitory computer-readable storage medium storing an executable computer program for causing a computer to perform a processing method according to any one of claims 1 to 2.

* * * * *